US012431140B1

(12) United States Patent
Kadaba Sathya Kumar et al.

(10) Patent No.: US 12,431,140 B1
(45) Date of Patent: Sep. 30, 2025

(54) LOAD TESTING PLATFORM FOR VOICE ASSISTANT-ENABLED TECHNOLOGIES

(71) Applicant: Amazon Technologies, Inc., Seattle, WA (US)

(72) Inventors: Puneeth Simha Kadaba Sathya Kumar, Pleasanton, CA (US); Saso Crnugelj-Gale, Half Moon Bay, CA (US); Chenyuan Wang, Sunnyvale, CA (US); Shilpi Nair, San Ramon, CA (US); Diyu Zhu, Milpitas, CA (US); Arwin Submaraniam, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 442 days.

(21) Appl. No.: 17/855,365

(22) Filed: Jun. 30, 2022

(51) Int. Cl.
*G10L 15/34* (2013.01)
*G10L 15/30* (2013.01)

(52) U.S. Cl.
CPC .............. *G10L 15/30* (2013.01); *G10L 15/34* (2013.01)

(58) Field of Classification Search
None
See application file for complete search history.

(56) References Cited

U.S. PATENT DOCUMENTS

| | | |
|---|---|---|
| 2008/0313601 A1 | 12/2008 | Huang et al. |
| 2017/0244604 A1* | 8/2017 | Arguelles ............ G06F 11/3414 |
| 2019/0311036 A1* | 10/2019 | Shanmugam ........... G06F 40/56 |
| 2020/0219494 A1 | 7/2020 | Dhoolia et al. |
| 2023/0089336 A1* | 3/2023 | Battiato ............... G06F 11/3684 717/124 |
| 2023/0097338 A1* | 3/2023 | Kalu ....................... G10L 13/02 704/200 |
| 2023/0385180 A1* | 11/2023 | Yannam .............. G06F 11/3688 |

OTHER PUBLICATIONS

U.S. Appl. No. 17/855,401, Pending.
Notice of Allowance, U.S. Appl. No. 17/855,401, May 22, 2024, 16 pages.

* cited by examiner

*Primary Examiner* — Pierre Louis Desir
*Assistant Examiner* — Kristen Michelle Masters
(74) *Attorney, Agent, or Firm* — Nicholson De Vos Webster & Elliott LLP

(57) ABSTRACT

Techniques are described for providing emulation software used to emulate voice assistant-enabled devices, and further for a platform used to perform and monitor large scale load tests against fleets of voice assistant-enabled device emulators. The emulation software broadly provides a collection of software libraries for creating emulated instances of a wide range of voice assistant-enabled device types capable of interacting with voice assistant services provided by a cloud provider network. The emulation software further includes software interfaces and observable data streams that enable developers to configure and extend emulated device capabilities, to obtain debugging and performance information, and the like. The described load testing platform further enables developers to test the performance of voice assistant-related technologies (including e.g., device features, voice assistant apps, third-party services, etc.) at scale.

20 Claims, 14 Drawing Sheets

SCHEDULE
CONFIGURATION
INTERFACE 600

SCHEDULE PAGE

BASIC SCHEDULE INFORMATION

Name of the schedule
test_experimental_schedule

Watchers
abc1@example.com; def2@example.com

Region of the schedule
NA

LOAD INFORMATION
10 % at 10 minutes +
20 % at 20 minutes +
40 % at 30 minutes +
80 % at 40 minutes +
100 % at 50 minutes +
50 % at 60 minutes +
0 % at 70 minutes +

FUTURE SCHEDULE EXECUTION INFORMATION (ONE TIME)

Scheduled Run
2022-09-28T19:00Z

☐ Cancel Scheduled Run

FUTURE SCHEDULE EXECUTION INFORMATION (RECURRING)

Execute starting from
2022-09-30T00:00Z

Recurrence interval (in days)
1

---

TERMS

Schedule Name: A name that uniquely identifies your schedule

Schedule Owner: The email alias of the owner

Watchers: Optional, used to receive schedule report when load is changed.

Region: One of the applicable regions (e.g., NA, EU, or FE)

Load Information: Load %: % of load to execute (>=0 and <= 120)
Time (in minutes): Relative time in minutes from the schedule start time the load is to be executed. (>= 5 and <= 360). Please note that each load level should be in effect no less than 5 minutes and each subsequent time for load change may never be equal to, or less than, the previous load change time.

Plan Information: Please select plans from the table below.

Future Schedule Execution Information (One Time): Scheduled Run: Date and time when the schedule will be executed. Cancel Scheduled Run: Cancels the scheduled execution.

Future Schedule Execution Information (Recurring): Execute on a recurring basis: Use this option if you want your schedule to recur. Execute starting from: Date and time when the recurring schedule is executed first. Execute starting from ...

*FIG. 6*

SCHEDULE
LISTING
INTERFACE 700

| LOAD TESTING SERVICE | | | | TEAM PLANS MONITOR SCHEDULES TOOLS | | HELP ADMIN |
|---|---|---|---|---|---|---|
| Schedules | | | | | | |
| Show [10] entries | | | | | SCHEDULE ACTIONS 702 | |
| Schedule Name | Region | Status | # of Plans | Owner | Time of Next Load Change | Actions |
| _test_exp_schedule | NA | NEW | 2 | a1@example.com | --- | ▷ ✎ 🗑 ☐ ↻ ▤ |
| _alm_schedule | NA | NEW | 1 | rhi3@example.com | --- | ▷ ✎ 🗑 ☐ ↻ ▤ |
| _test_ref_1 | FE | ERROR | 5 | cp@example.com | --- | ▷ ✎ 🗑 ☐ ↻ ▤ |
| ... | | | | | | |
| ... | | | | | | |
| test-audit-1 | NA | NEW | 2 | pn@example.com | --- | ▷ ✎ 🗑 ☐ ↻ ▤ |
| | | | | | | ADD NEW |

*FIG. 7*

SCHEDULE
LISTING
INTERFACE 900

| LOAD TESTING SERVICE | | | | TEAM PLANS MONITOR SCHEDULES TOOLS | | HELP ADMIN |
|---|---|---|---|---|---|---|
| Schedules | | | | | | |
| Show [10] entries | | | | | SCHEDULE ACTIONS 702 | |
| Schedule Name | Region | Status | # of Plans | Owner | Time of Next Load Change | Actions |
| _test_exp_schedule | NA | NEW | 2 | a1@example.com | --- | ▷ ☑ 🗑 ☐ ↻ ▤ |
| _alm_schedule | NA | NEW | 1 | rhi3@example.com | --- | ▷ ☑ 🗑 ☐ ↻ ▤ |
| _test_ref_1 | FE | ERROR | 5 | cp@example.com | [-5]  19:37:53 (UTC)  [+5] | ▷ ☑ 🗑 ☐ ↻ ▤ |
| ... | | | | | LOAD CHANGE MODIFICATION ELEMENTS 902 | |
| ... | | | | | | |
| test-audit-1 | NA | NEW | 2 | pn@example.com | --- | ▷ ☑ 🗑 ☐ ↻ ▤ |
| | | | | | | ADD NEW |

*FIG. 9*

LOAD TESTING PLATFORM FOR VOICE ASSISTANT-ENABLED TECHNOLOGIES

BACKGROUND

Some cloud service providers today provide cloud-based voice services that enable third-party device manufacturers and other users to build natural voice experiences into a wide range of consumer devices. The ability to use natural voice, for example, can provide a highly intuitive way for users to interact with such devices. The development of voice assistant-enabled devices can involve using application programming interfaces (APIs), reference solutions, and documentation to help build desired device experiences. Developers can also create apps, or skills, that enable the addition of new features, content, and services to voice assistant-enabled devices.

BRIEF DESCRIPTION OF DRAWINGS

Various examples in accordance with the present disclosure will be described with reference to the drawings, in which:

FIG. 6 illustrates an example schedule configuration interface according to some examples.

FIG. 7 illustrates an example schedule listing interface according to some examples.

FIG. 9 illustrates an example schedule listing interface enabling users to dynamically adjust times at which load changes occur according to some examples.

DETAILED DESCRIPTION

Figure 1:
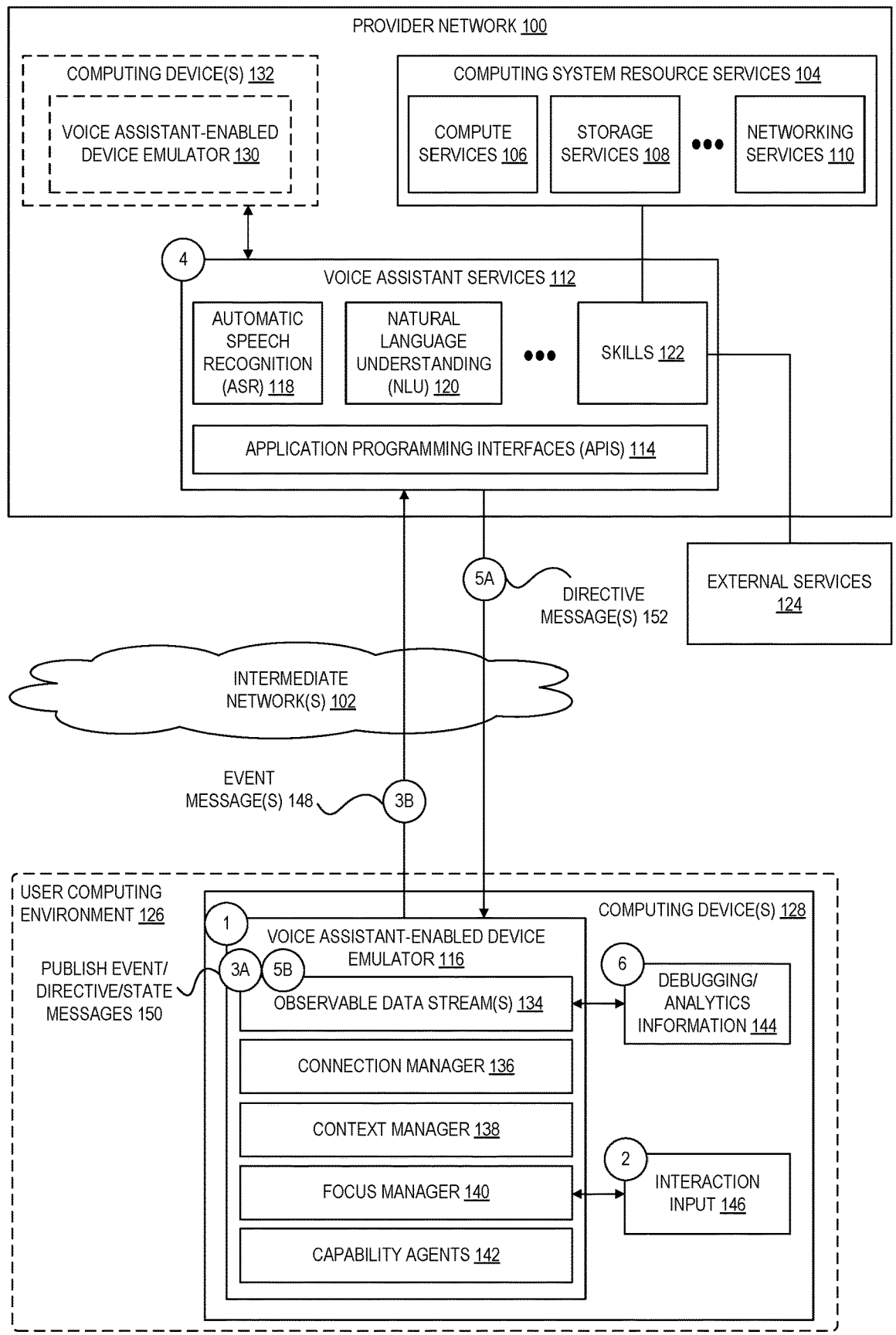
FIG. 1 is a diagram illustrating an environment for configuring and using emulation software for voice assistant-enabled devices according to some examples.

The present disclosure relates to methods, apparatus, systems, and non-transitory computer-readable storage media for emulation software used to emulate voice assistant technology-enabled devices, and further for a platform used to perform and monitor large scale load tests against configurable collections of voice assistant-enabled device emulators. The emulation software broadly provides a collection of software libraries for creating emulated instances of a wide range of voice assistant-enabled device types capable of interacting with voice assistant services provided by a cloud provider network. The emulation software further includes software interfaces and observable data streams that enable developers to configure and extend emulated device capabilities, to obtain debugging and performance information, and the like. The load testing platform described herein further enables developers to test the performance of voice assistant-related technologies (including e.g., new types of devices and device features, voice assistant apps, third-party services supporting voice assistant features, etc.) at scale using configurable fleets of emulated voice-assistant enabled devices. The ability to readily emulate a wide range of virtual assistant technology-enabled devices and to efficiently perform load testing against fleets of emulated devices enables voice assistant-enabled device enables developers to more efficiently develop and test new features, to test integrations of voice assistant technologies into new types of devices, and to analyze the performance of voice assistant technologies under varying load conditions, among other benefits.

Voice assistant-enabled devices (including, e.g., devices compatible with the Amazon Alexa® services) today can include smart speakers, mobile devices, wearable devices, appliances, among many other types of devices. These devices continue to increase in their popularity and breadth of functionality due in part to the ease of using voice as an input mechanism. Many of these technologies are powered in part by cloud-based services provided by cloud providers, where the provided services can include functionality to perform automatic speech recognition (ASR), natural language understanding (NLU), and other functionality enabling human interaction with devices using their voice. These technologies enable users to use their voice, for example, to obtain real-time information, play music, create alarms, play audiobooks, operate smart home devices, among many other types of possible device interactions.

Today, some cloud service providers provide the ability for developers to extend the broad technology platform powering voice assistant-enabled devices in a variety of ways. As one example, developers can create voice assistant-related apps, sometimes also referred to as skills, to add new types of interaction possibilities with voice assistant services. For example, developers can create apps or skills to enable voice assistant-enabled devices to provide information obtained from an external service, to enable devices to interface with new types of smart home technologies, to enable users to play new games using a device, and the like. As another example, developers can integrate voice assistant technologies into existing or new types of devices. For example, some cloud providers provide software development kits (SDKs) and other tools that enable developers to integrate voice assistant technologies into third-party manufactured speakers, home appliances, and other types of devices.

As with nearly any technology, the development of voice assistant-related technologies typically involves testing and debugging to identify software bugs, performance issues, and the like. Some types of testing can be performed using physical voice assistant-enabled devices. For example, a developer creating a new skill or device feature can perform testing by attempting to interact with the skill or device feature using an existing physical product configured to interact with cloud-based voice assistant services. However, using a physical device, it can be difficult for developers to obtain low-level debugging information or to test the performance of new features using a variety of different device types. Furthermore, for developers creating new types of voice assistant-enabled devices or extending the capabilities of existing devices, a physical device with the features under development may not yet be available for testing.

As another option, some types of testing can be performed using simulated versions of the software running on voice assistant-enabled devices. In contrast to the emulation software described herein, a software simulation is essentially an exact copy of the software running on a particular device executed using a different type of computing host (e.g., a generic computing host). A simulator, for example, can provide accurate representations of the actions a device performs in many scenarios. However, simulated versions of device software are generally more resource intensive, provide fewer entry points for extensibility, do not provide easy access to debugging or logging information, and generally can only simulate device software that already exists.

To address these challenges, among others, the device emulator software described herein enables developers to readily test voice assistant-related technologies using emulated instances of voice assistant-enabled devices. The device emulator software can be executed on virtually any computing host, enabling the emulator to establish a connection with cloud-based services and to act as a physical device (including, e.g., sending events responsive to interactions, responding to directives from the cloud-based services, and maintaining state across multi-turn chat dialogs and action sequences). Among other features, the emulator software provides interfaces that enable developers to easily extend or modify device features, obtain low-level debugging and logging information, and to emulate a wide variety of device types using configurable device definitions.

Furthermore, as described above, a voice assistant-enabled device load testing platform is provided to enable developers and other users to test the performance of voice assistant-related technologies at scale. As described in more detail herein, the load testing platform enables users to create load test profiles, or plans, indicating a distribution of one or more types of emulated devices against which to perform interactions, an amount of load to simulate over defined periods of time, an execution environment used to host the emulated devices, among other configurations. Users can further configure schedules used to execute one or more plans at specified times. Upon execution, the load testing platform can monitor the performance and operation of the emulated devices and associated services and provide progress reports of the load tests, thereby enabling users to readily obtain comprehensive information about voice assistant technologies of interest under high load, among other benefits.

FIG. 1 is a diagram illustrating an environment for configuring and using emulation software for voice assistant-enabled devices according to some examples. A provider network 100 (or "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 102 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network 100 (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network 100 via a publicly accessible network 102 (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network 100 can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

FIG. 1 illustrates a provider network 100 that provides computing system resource services 104, including compute services 106, storage services 108, networking services 110, among others. For example, compute services 106 can include a hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another example compute service 106 is a container service, which can be a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Yet another example of a compute service 106 is an on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

As indicated, in some examples, a cloud provider network 100 includes voice assistant services 112 that broadly enable developers to create voice assistant-related technologies. The voice assistant services 112, for example, can enable device makers and developers to integrate an ever-growing set of voice assistant-based features into connected devices, develop skills used to extend the functionality of connected devices, among other possibilities for extending a voice assistant technology platform. A connected device, for example, can generally include any device with a wake word-enabled microphone, optionally a speaker, and some set of voice assistant features and functions. The voice assistant services 112 include APIs 114 that generally correspond to various types of client functionality such as those described herein in connection with a voice assistant-enabled device emulator 116.

As shown in FIG. 1, the voice assistant services 112 include components such as, for example, automatic speech recognition (ASR) 118 services, natural language understanding (NLU) 120 services, and skills 122, among other possible components. The ASR 118 services, for example, include technology broadly used to convert spoken words into text, which can be more easily used to process user requests. For example, if a user uses a voice assistant-enabled device to ask a question (e.g., "what's it like outside?"), an initial step in processing such a request can involve converting the audio-based utterance (e.g., as captured by a microphone connected to the device) into a text-based utterance equivalent. To do so, the ASR 118 services can receive audio-based utterance input from connected devices, detect patterns in audio waveforms, match them with the sounds in a given language, and ultimately identify the words spoken by a user.

The NLU 120 services further enable voice assistant services 112 to deduce what a speaker means by the words provided as an utterance. For example, the NLU 120 services can help the voice assistant services 112 to determine that a user is likely asking for a weather forecast when the user asks: "what's it like outside?" The NLU 120 services broadly use artificial intelligence-based techniques to recognize patterns and meaning within human language. In particular, the NLU 120 services can help the voice assistant services 112 identify the intent of user requests, identify utterances used to signal their goal and intent, provide users with opportunities to correct errors or change their answers if needed, and build exceptions to indeterminate requests.

In some examples, skills 122 represent types of apps that enable various types of interactions with voice assistant-enabled devices. For example, skills 122 can be created and used to enable users to play games, listen to podcasts, order products, and the like, using a voice assistant-enabled device connected to the voice assistant services 112. Some types of interactions may be built into voice assistant services 112 by default, and thus may be referred to instead as features, whereas skills 122 can represent extensible ways to add new types of features over time. In some examples, the operation of both voice assistant services 112 features and components, as well as skills 122, can rely in part on computing resources provided by other computing system resource services 104, by external services or applications 124, or combinations thereof.

When a device interacts with the voice assistant services 112, in some examples, the interaction follows a request lifecycle. The request lifecycle can begin, for example, with a device receiving a voice-based utterance (e.g., a user asking "what is the weather?), creating a unique dialogue request identifier for the request, and sending one or more event messages to the voice assistant services 112 including the dialogue request identifier. Once the voice assistant services 112 receives an event message corresponding to an audio-based utterance, it converts the audio-based utterance into text using ASR 118 services, uses NLU 120 services to identify what the request means, and processes the request. The voice assistant services 112 can then obtain a response to the request (e.g., using one or more skills 122 or other services) and send a response in the form one or more directive messages back to the requesting device. Once received, the device determines how to process the directive(s) (where the directive might, e.g., instruct the device to play an audio-based response, display graphics on a screen, etc.) and carries out the instructed action(s). In some examples, these communication channels between a device and the voice assistant services 112 can be implemented using HTTP/2 endpoints or other protocols that enable the exchange of asynchronous event and directive messages.

As indicated herein, developers creating new types of voice assistant-enabled devices, device features, skills, or otherwise extending voice assistant technology platform can benefit from testing those features while under development to identify bugs, performance issues, etc. The voice assistant-enabled device emulator 116 described herein enables users to readily perform such testing, among other benefits. The numbered circles in FIG. 1 illustrate an example process for installing, configuring, and using an emulator for voice assistant-enabled devices. At circle "1," for example, a user obtains and executes a voice assistant-enabled device emulator 116 in a user computing environment 126 using one or more computing device(s) 128. The user computing environment 126, for example, can generally be any type of computing environment to which a developer has access, including a local network, datacenter, etc. In some examples, the user computing environment 126 can be part of the cloud provider network 100 (e.g., a developer can execute a voice assistant-enabled device emulator 130 on computing device(s) 132 in a provider network 100). The computing device(s) 128 generally represent any type of physical or virtual computing device upon which software, including a voice assistant-enabled device emulator 116, can be executed. In some examples, a provider of the voice assistant-enabled device emulator 116 can provide the emulator in the form of a software development kit (SDK) and associated tools, as a standalone executable, or in any other format. As described in more detail in relation to FIG. 2, providing an emulator 116 in the form of an SDK can enable developers to integrate custom code, debugging tools, or other desired functionality into an emulator, among other benefits.

To use a voice assistant-enabled device emulator 116 to emulate a physical voice assistant-enabled device, an initial step can involve authorizing the emulator 116 with the voice assistant services 112. The authorization of an emulator 116, for example, can include the emulator obtaining an access token to be included in requests sent to the voice assistant services 112. In some examples, a user can use a companion app (e.g., running on a user's mobile device) to obtain an authorization code and transfer the authorization code to the emulator 116. The emulator 116 can then use the authorization code to obtain access and refresh tokens. In other examples, other types of code-based authorization processes can be used to provide the emulator with device tokens used to authenticate and authorize communications with voice assistant services 110.

In FIG. 1, several components of a voice assistant-enabled device emulator 116 are shown, including observable data stream(s) 134, a connection manager 136, a context manager 138, a focus manager 140, and capability agents 142. These components are illustrated for exemplary purposes only; in other examples, an emulator 116 can include more or fewer components.

In some examples, the observable data stream(s) 134 include one or more data streams to which subscribers (e.g., other components of an emulator 116 or external processes or applications) can obtain information about events, directives, and state changes occurring with respect to an emulator. A data stream, in this example, broadly represents a sequence of data elements made available over time by an emulator 116 and which reflect the operation of the device as it receives interaction input, sends event messages to the voice assistant services 112, receives directive messages from the voice assistant services 112, updates a state of the emulator responsive to interaction input, directives, or other conditions. In some example, the observable data stream(s) 134 are implemented using the Reactive Streams library, which provides ways to manage stream data across an asynchronous boundary with non-blocking back pressure. For example, a separate subscriber process or component of the emulator 116 can subscribe to the data stream(s) 134 to produce debugging/analytics information 144 or perform other actions to assist with debugging the operation of the emulator 116.

In some examples, the connection manager 136 is used to manage connections with the voice assistant services 112, e.g., so that the emulator 116 can send events to the voice assistant services 112 and receive directives. This can include, e.g., sending audio-based data corresponding to voice input interactions, sending state updates, receiving directives specifying actions for the emulator 116 to be perform, etc. As indicated, in some examples, the connection manager 136 can create connections with the voice assistant services 112 using HTTP2 connections supporting concurrent streams and can include obtained access tokens with requests to authenticate and authorize the emulator to use the voice assistant services 112 APIs 114. In some examples, a connection manager 136 sends each new event in its own stream and, typically, closes the stream after the voice assistant services 112 returns the appropriate directives and corresponding audio attachments to the emulator 116.

In some examples, the context manager 138 communicates the state of emulated device components to the voice assistant services 112 using context objects. For example, an emulator 116 can be configured to manage audio and visual channel states of the emulated device and to automatically include related context information with event messages sent to the voice assistant services 110. A context object included in an event message, for example, can generally include any data reflecting the status of client components before an associated event is sent to voice assistant services 112. This data can be used, for example, to help the voice assistant services 112 best know how to respond to a given request. For example, consider a scenario where an emulator 116 is playing an audio stream and, during playback, receives input indicative of a speech request. When the emulator 116 sends a "recognize" event to the voice assistant services 112 responsive to the speech request, the emulator can include a context object reflecting that an audio stream was playing by including a context entry with information indicating, e.g., that playback was occurring, a time offset in the audio stream, etc. This information can be used to help the voice assistant services 112 know how to respond to the request (e.g., if the user requests "who sings this song?" and the context information includes information about an audio stream being played, the voice assistant services 112 can respond with corresponding information). In some examples, the focus manager 140 can be used to further improve the accuracy of responses when a user makes an ambiguous request involving actions that are independent of the voice assistant services 112 (e.g., offline audio playback or screen-based interactions).

In some examples, the emulator 116 can receive exception messages upon detection of an error. For example, errors can occur because of malformed events or too many requests, and the voice assistant services 112 return a message to the emulator 116 including an exception code and a description. In some examples, these exception messages can be published to an observable data stream 134 for debugging or logging.

In some examples, the capability agents 142 represent implementations of device actions. For example, if a user requests to play a song, a capability agent 142 is responsible for loading the song (e.g., as provided in a response from voice assistant services 112) in a media player and playing it. In general, a capability agent 142 receives a directive from voice assistant services 112, reads the payload of the message, and performs the requested action at the emulator 116. In some examples, capability agents 142 can include a wide variety of device features including an agent for handling alerts, managing and controlling audio playback, adjusting equalizer settings, displaying notifications, volume control, speech output, rendering visual data, and the like. As described in more detail with respect to FIG. 2, the capability agents 142 can be extended by developers to modify existing capability handling or to add entirely new capabilities.

At circle "2" in FIG. 1, interaction input 146 is provided to the voice assistant-enabled device emulator 116. As indicated above, the types of interactions that can be performed with a voice assistant-enabled device include voice utterances, which can be provided to a voice assistant-enabled device emulator 116 in the form of audio-based data. The audio-based data can be captured using an audio input device connected to a computing device 128 or can be provided to the emulator in any other form (e.g., using audio utterances captured by another device or pre-recorded utterances). The emulator 116 can also accept text-based utterances provided to the emulator using a file (e.g., containing one or more text-based utterances), console input, as part of code integrated with the emulator 116, or using any other mechanism. The interaction input 146 can also include other types of input such as, e.g., indications of touch input (e.g., reflecting a user touching a touch-enabled device screen), device button input, etc. These types of input can be provided, e.g., using text-based representations of the input that can be ingested by the emulator 116 in real-time. In some examples, a voice assistant-enabled device emulator 116 can also be configured to send arbitrary events to voice assistant services 112 (e.g., events not necessarily triggered by corresponding interaction input 146). For example, by extending certain interfaces of the emulator 116, a developer can cause the emulator 116 to send specified event messages to the voice assistant services 112, e.g., to test certain types of functionalities in ways that may be difficult to test otherwise.

At circles "3A" and "3B," the voice assistant-enabled device emulator 116 generates event-related data responsive to the interaction input 146 or other conditions. As indicated above, responsive to receiving interaction input 146 (e.g., voice-based utterance input, text utterance input, touch input, etc.), an emulator 116 can generate and send one or more messages to the voice assistant services 112 reflecting an event associated with the input (e.g., an event indicating that the voice assistant enabled-device requests for the voice assistant services 112 to recognize and process voice-based input, or an event indicating that certain touch-based input was provided to the emulator 116). In some examples, at circle "3A," the emulator 116 can publish information about these events to the observable data stream(s) 134 for receipt by any components subscribing to the message stream, indicated by publish event/directive/state messages 150. As indicated, the event messages 148 can include information about the type of event (e.g., a speech recognize event, a touch input event, etc.), an indication of the interaction input 146 triggering the event, a time at which the event is generated, context information associated with the device, among other possible information.

At circle "4," the voice assistant services 110 processes event message(s) 148 received from a voice assistant-enabled device emulator 116. As described elsewhere herein, the processing of event message(s) 148 can include performing ASR processes, NLU processes, skills-based processing, among other operations depending on a type of event message 148 received. Furthermore, processing of an event message 148 can include interfacing with one or more skills 122, external services 124, or both, to obtain information or data used to create a response to an event. Once the voice assistant services 112 processes the request, at circle "5A," the voice assistant services 112 can send directive message(s) 152 to the requesting emulator 116. Similar to the processing of event message(s) 148 described above, at circle "5B," upon receipt the directive message(s) 152, the emulator 116 can publish information associated with the directive message(s) 152 to observable data stream(s) 134 that can be obtained by one or more subscribers to the observable data stream(s) 134 to create, e.g., debugging/analytics information 144.

In some examples, the voice assistant-enabled device emulator 116 further can capability agents 142 to perform one or more actions responsive to the directive message(s) 152. For example, depending on the type of directive received from the voice assistant services 112, one or more capability agents 142 can be invoked to cause speech playback to occur based on audio payload data included with a directive, to playback other types of audio, display graphical data, etc.). In some examples, since an emulator 116 does not include a physical display screen as an emulated device, a capability agent 142 or extension thereof can display graphical data using a separate application interface, web browser, or any other application capable of rendering display information included with a directive message. For example, because the emulator 116 provides direct access to directive payloads via observable data stream(s) 134 or other interfaces, components of the emulator 116 can perform arbitrary actions on the payload data depending on a developer's desires. As indicated, the emulator 116 can further update state information maintained by the emulator 116 as needed depending on the type of directive, actions performed, or other changes to the state of the emulator 116.

Although the example shown in FIG. 1 illustrates an interaction lifecycle including an emulator 116 receiving interaction input, generating one or more event messages, and receiving one or more corresponding directive messages, other types of interactions with voice assistant services 112 are possible. For example, voice assistant services 112 can send service-initiated directives to an emulator 116 (e.g., directives not corresponding to any particular event received from an emulator 116), e.g., to send notifications to an emulator, to send device changes made by a companion app or other external service, and the like. The emulator 116 can receive such service-initiated directives and process accordingly, including, e.g., publishing information associated with the directive messages to observable data stream(s) 134.

In some examples, at circle "6," a component of the voice assistant-enabled device emulator 116 provides debugging/analytics information 144. As indicated above, one or more components of the emulator 116 or one or more external processes can subscribe to the observable data stream(s) 134 to obtain the debugging/analytics information 144 based on events and directives passing through the emulator 116, state changes occurring within the emulator 116, or any other information published by the emulator 116 to the observable data stream(s) 134. The debugging/analytics information 144 can be saved to a file, displayed in a console, displayed in another type of application, of generally acted upon as desired by a developer for various testing or debugging purposes.

As indicated, in some examples, the emulator 116 further enables developers to access directive payload data to perform types of action processing that might not otherwise be possible with a physical device. For example, if a directive message from the voice assistant services 112 includes an audio stream, a developer can extend the emulator 116 to obtain access to the audio stream itself (e.g., by obtaining the information from a message published to observable data stream(s) 134 or other ways) and perform arbitrary actions (e.g., slowing down or speeding up playback, playing the audio data in another application, etc.). As another example, an emulator 116 provide access to payload data including graphical layout information and rendering the graphical layout information in an application of choice.

In some examples, the operation of the voice assistant-enabled device emulator 116 can include maintaining state associated with interactions and responsive actions. For example, the emulator 116 can maintain information about dialogue identifiers used to help the emulator 116 perform multi-turn chat dialogs with the voice assistant services 112 (e.g., if an emulator 116 sends a request asking about the weather, the voice assistant services 112 may first send a response asking for clarification on a location, and then the emulator can respond with a same dialogue identifier providing the clarification). As another example, the emulator 116 can maintain state information about a location within an audio stream being played (e.g., to enable the emulator 116 to send playback time information to obtain lyrics associated with a song as the song plays for a karaoke app). In some examples, updates to state information maintained by the emulator 116 is published to the observable data stream(s) 134, providing additional debugging/analytics information 144 that is not readily accessible from physical devices and that can be helpful in diagnosing bugs or other performance issues.

Figure 2:
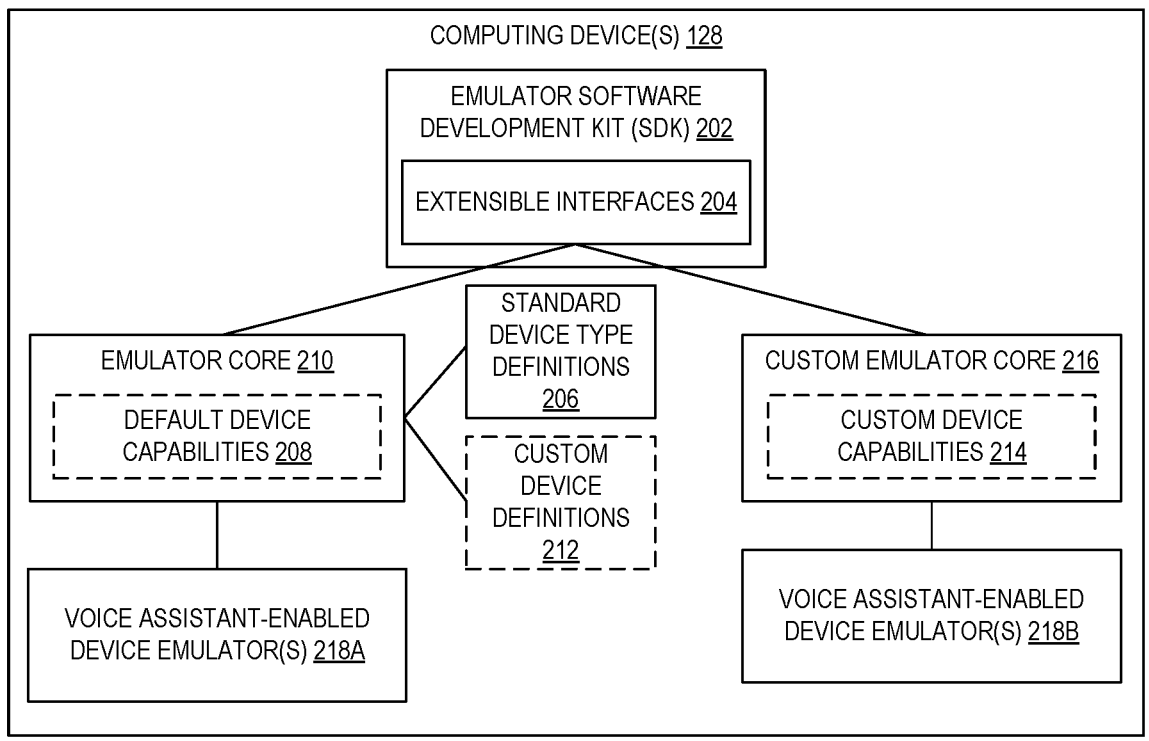
FIG. 2 is a diagram illustrating example uses of a software development kit (SDK) for a voice assistant-enabled device emulator according to some examples.

FIG. 2 is a diagram illustrating example uses of a software development kit (SDK) for a voice assistant-enabled device emulator according to some examples. FIG. 2, for example, illustrates how developers can create new behaviors or capabilities, add new device types or configurations without code changes, optionally support other connection types, among other customizations to a voice assistant-enable emulator. In FIG. 2, for example, illustrates an emulator SDK 202 including extensible interfaces 204. The SDK 200, for example, can be obtained from an operator of the voice assistant services 112 provided for the purposes of enabling developers to extend the capabilities of an emulator 116.

The extensible interfaces 204 include interfaces that developers can implement with their code to modify or add the behavior of capability agents (e.g., capability agents 142), modify connection behaviors, or other aspects of a voice assistant-enabled emulator 116. For example, a developer can create code implementing custom device capabilities 214 to be integrated in a custom emulator core 216, e.g., to process audio-based directives, to enable an emulator 116 to send new types of event messages, and the like. In some examples, users can also implement custom capabilities associated with an emulator's connection to voice assistant services 112. For example, a developer can implement a connection interface of extensible interfaces 204 to simulate varying network conditions (e.g., including simulated network latency, dropped packets, network outages, and the like).

In some examples, an emulator SDK 200 includes an emulator factory (e.g., a class based on the factory method design pattern) is provided for instantiating emulators based on a specified device type. For example, a developer of the SDK 200 can provide any number of standard device type definitions 206 which refer to capability agent implementations corresponding to particular physical devices. The standard device type definitions 206 can include, for example, definitions corresponding to exist types of voice assistant-enabled speakers, appliances, or any other device, where the corresponding capability agent implementations cause the emulator to behave as the specified type of device (e.g., as represented by default device capabilities 208 integrated into an emulator core 210). In some examples, the standard device type definitions 206 can further include different versions of a same physical device, e.g., such that an instantiated emulator can behave as a type of device at the time the device launched, as the same device after one or more software upgrades, etc. Using the emulator factory and standard device type definitions 206, developers can easily instantiate an emulator corresponding to virtually any type of existing device without any changes to the emulator code itself. Furthermore, users can create and provide custom device definitions 212 corresponding to capability agent feature sets that may not coexist in any exiting physical device but for which a developer wants to test. As shown in FIG. 2, using any of these mechanisms, users can instantiate any number of voice assistant-enable device emulators 218A, 218B, etc.

In some examples, users can also create custom implementations of the extensible interfaces 204 to modify or extend many of the different device interfaces and features such as, e.g., capability agents and associated behaviors, connection features, and the like. In this example, users can create one or more custom device capabilities 214, which can be integrated into a custom emulator core 216, to enable the instantiation of one or more voice assistant-enabled device emulator(s) 218B.

Figure 3:
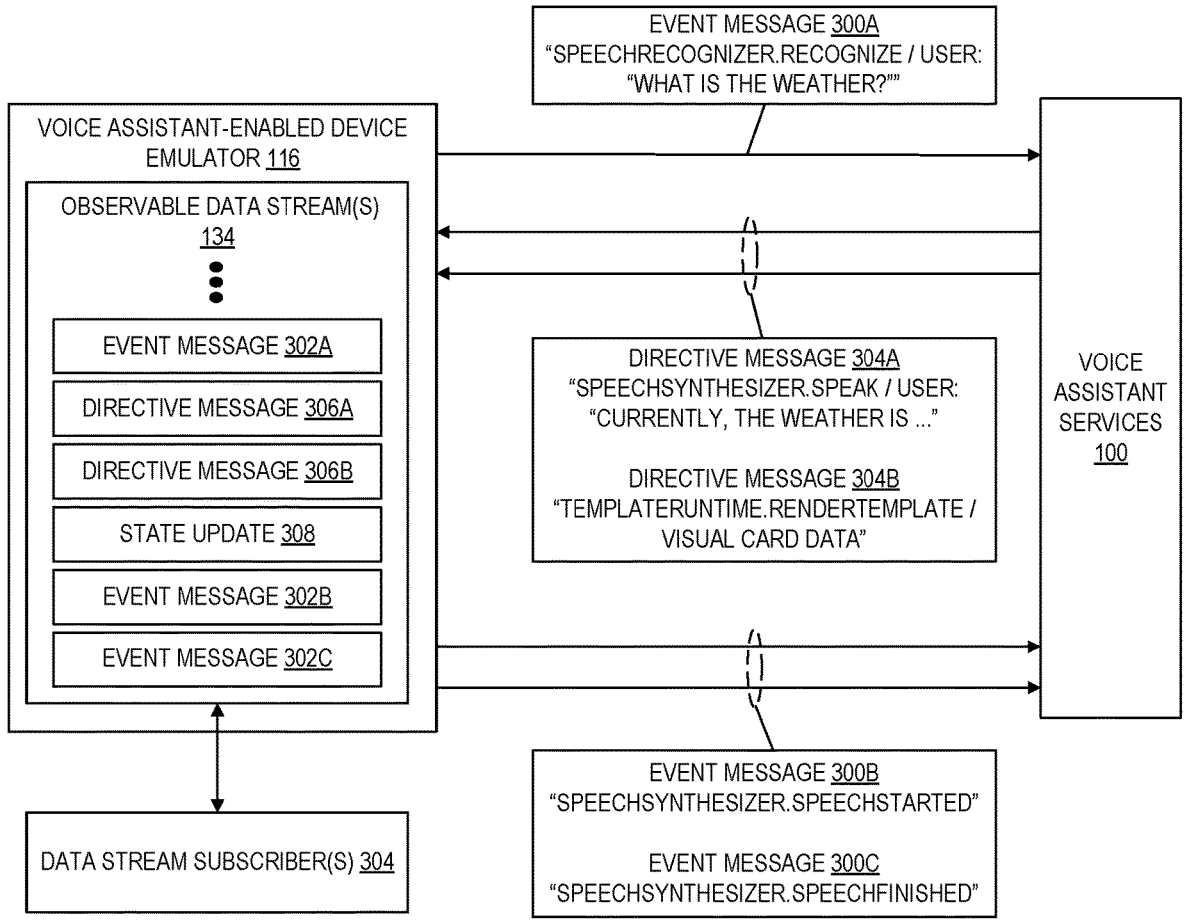
FIG. 3 is a diagram illustrating the use of an observable data stream to provide access to event messages, directive messages, and other state information associated with the operation of a voice assistant-enabled device emulator according to some examples.

As indicated, a voice assistant-enabled device emulator 116 can provide information about the operation of a device for debugging or logging purposes via observable data stream(s) 134. FIG. 3 illustrates additional details related to publishing event and directive messages and other information to one or more observable data stream(s) 134. As shown in FIG. 3, a voice assistant-enabled device emulator 116 maintains one or more observable data stream(s) 134. In various examples, the emulator 116 can maintain separate message streams for different types of device messages (e.g., one for event messages, one for directive messages, etc.) or can maintain a single message stream multiple different types of messages.

In the example of FIG. 3, at some point in time, a voice assistant-enabled device emulator 116 sends an event message 300A corresponding to a "speech recognizer" event requesting the voice assistant services 112 to recognize speech audio input. As indicated above, the speech input can come from an audio input device connected to the emulator 116, based on pre-recorded audio, based on audio obtained from a text-to-speech service, or any other source. The emulator 116 in FIG. 3 publishes a corresponding event message 302A to an observable data stream 134, where a data stream subscriber 304 can access the messages in the observable data stream 134. Responsive to the event message 300A, the voice assistant services 112 processes the event request and responds with two directive messages 304A, 304B, where the directive messages request the voice assistant-enabled device emulator 116 to synthesize speech reflecting an answer to the question posed in the event message. In this example, the voice assistant services 112 further send a second directive message 304B instructing the emulator 116 to display visual data, e.g., corresponding to a weather report.

Similar to above, the emulator 116 publishes directive messages 306A, 306B to the observable data stream(s) 134 reflecting the directive messages received from the voice assistant services 112. At some point in time, the emulator 116 further publishes a state update 308 to the observable data stream(s) reflecting some change in state information associated with the emulator (e.g., reflecting that a state of a display screen changed, a state of a multi-turn chat dialog with the voice assistant services 112 changed, etc.). In FIG. 3, the voice assistant-enabled device emulator 116 then sends two additional event messages 300B, 300C, to the voice assistant services 112 indicating that the device has started the speech synthesizer action and to further indicate when the speech synthesizer has finished. The voice assistant-enabled device emulator 116 similarly publishes corresponding event messages 302B and 302C. As illustrated in FIG. 3, the emulator 116 can both act in near identical fashion to a physical voice assistant-enabled device and further provide developers with ready access to information about message passing through the emulator 116 and other state change information that can be useful for testing and debugging purposes.

Figure 4:
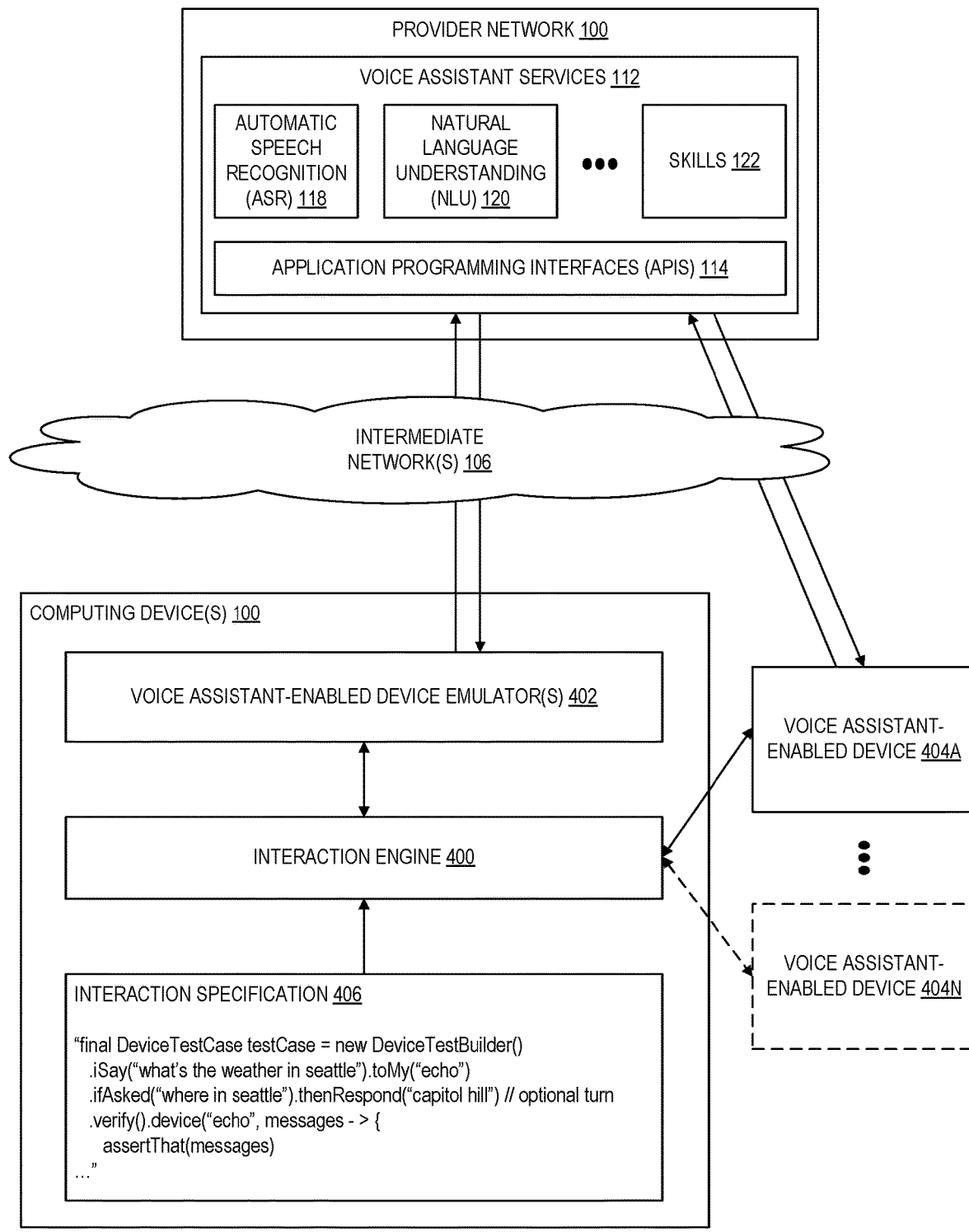
FIG. 4 is a diagram illustrating the use of an interaction engine to automate interactions with one or more emulated voice assistant-enabled devices, physical voice assistant-enabled devices, or combinations thereof, according to some examples.

As indicated above, testing the performance of a voice assistant-related technology can often involve providing interaction input to a voice assistant-enabled emulator and analyzing the performance of the emulator or other parts of a voice assistant-technology platform. In some examples, an interaction engine is provided to help automate aspects of providing interaction input to emulated voice assistant-enabled devices, physical voice assistant-enabled devices, or combinations thereof. FIG. 4 is a diagram illustrating the use of an interaction engine to automate interactions with one or more emulated voice assistant-enabled devices, physical voice assistant-enabled devices, or combinations thereof, according to some examples.

In some examples, an interaction engine 400 can be configured to interface with one or more voice assistant-enabled device emulator(s) 402, physical voice assistant enabled devices (e.g., device 404A, . . . , 404N). Although the voice assistant-enabled emulator(s) 402 are shown running on one or more same computing device(s) 128 in FIG. 4, in other examples, the interaction engine and emulators 402 can run on separate devices connected over one or more computer networks.

As shown in FIG. 4, in some examples, an interaction engine 400 supports a domain-specific language (DSL) enabling users to specify types of interactions to be performed using an intuitive specification language. The example interaction specification 406, for example, includes a snippet of a specification including an interaction involving an example utterance asking "what's the weather in seattle" and further specifying at least one device to which the interaction is to be sent. The interaction specification language can further enable users to specify assertions for testing whether an emulator or physical device receives an expected response back from specified input interactions. As indicated, the interaction engine 400 further enables a user to test interaction inputs with a virtualized emulator 402 and one or more physical voice assistant-enabled devices 404A, . . . , 404N, thereby enabling developers to verify whether an emulator and physical device respond in similar ways to the same or similar input. In some examples, the interaction engine 400 can interface with any type of physical voice assistant-enabled device using various drivers to facilitate connections via Universal Serial Bus (USB), network-based connections, and the like.

When developing new devices, services, and applications, developers sometimes desire to perform large scale load tests (sometimes called "gamedays") against the technologies to help ensure that the technologies can withstand periods of unusually high traffic (e.g., on holidays, sales events, etc.). Ensuring that these technologies can withstand such load, for example, helps to ensure that users of the technologies do not experience errors, downtimes, and the like during these periods. For these and other reasons, developers of voice assistant-related technologies might often desire to perform large scale load tests against voice assistant-enabled devices to test related technologies under development (e.g., new types of voice assistant-enabled device features, skills, third-party services, etc.).

According to examples described herein, a load testing service for voice assistant-enabled devices is provided by a cloud provider network. Among other features, the load testing service provides a web-based portal that enables users to create load test profiles, or "plans." In some examples, a plan can include information about a maximum or target rate of transactions (e.g., interactions with a collection of voice assistant-enabled devices) to be executed, information about compute resources to be used to host a fleet of voice assistant-enabled devices, a distribution of types of voice assistant-enabled devices against which to execute the load tests, and utterances to be used to perform the interactions. The load testing service is further configured to enable users to configure components used to monitor and report performance and operational metrics related to the emulated devices, dependent services, or combinations thereof.

Figure 5:
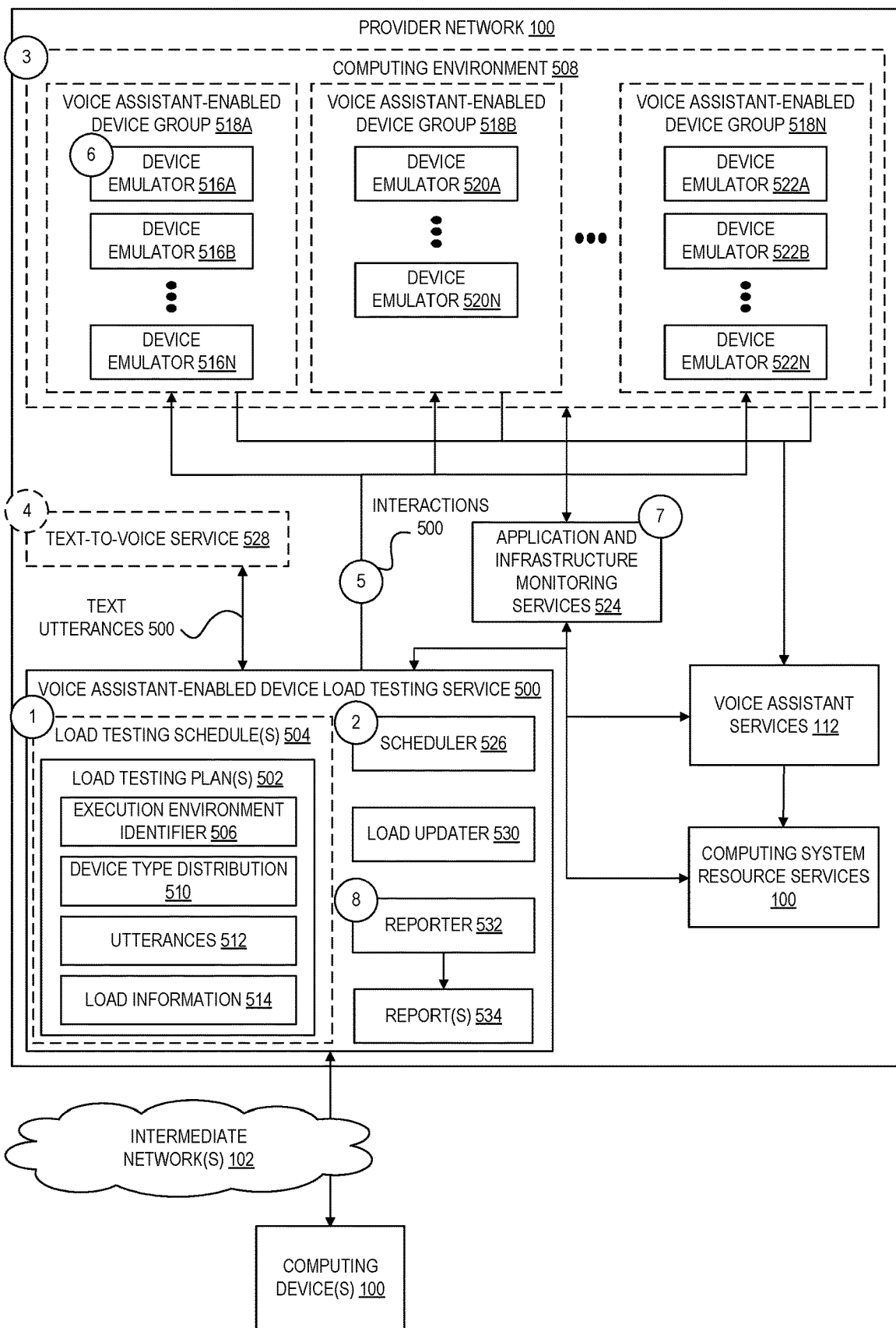
FIG. 5 is a diagram illustrating a computing environment including a voice assistant-enabled device load testing service according to some examples.

FIG. 5 illustrates a computing environment including a voice assistant-enabled device load testing service according to some examples. As shown, a voice assistant-enabled device load testing service 500 is provided as part of a provider network 100 and provides APIs and a web-based portal that users can users to configure load testing plans, configure and execute load testing schedules, and to view performance reports and other information, among other features. The numbered circles labeled "1" through "6" illustrate an example process involving a user configuring one or more load testing plans 502 (and optionally one or more associated load testing schedule(s) 504), a voice assistant-enabled device load testing service 500 performing configured load plans, and the voice assistant-enabled device load testing service 500 generating one or more associated reports 534 reflecting performance information based on the executed load tests.

At circle "1," in some examples, the voice assistant-enabled device load testing service 500 receives input specifying configurations for one or more load testing plans 502 and optionally for one or more associated load testing schedules 504. In some examples, the input is received via a web-based portal or other GUI provided by the load testing service 500. The input specifying the configurations for a load testing plan can include, for example, an identifier 506 of an execution environment including one or more compute instances to be used to launch emulators for voice assistant-enabled devices (e.g., a computing environment 508), values indicating a distribution 510 of two or more types of voice assistant-enabled devices to be launched in the execution environment, and one or more text utterances 512 to be used to invoke interactions with the emulators for voice assistant-enabled devices, load information 514 indicating a rate of interactions to be invoked against voice assistant-enabled device emulators in the execution environment, among other possible configurations.

The identifier 506 of an execution environment can include, for example, a URL or other identifier of a collection of compute instances (e.g., VM instances, containers, etc.) that the voice assistant-enabled device load testing service 500 can used to launch device emulators on behalf of a user performing the load testing. In some examples, the identifier of the execution environment can further include identifiers of one or more accounts of the provider network 100 to be used in association with launched device emulators (e.g., for the purposes of obtaining access tokens or performing other actions with respect to the cloud provider network 100).

In some examples, the values indicating a distribution 510 of two or more types of voice assistant-enabled devices to be launched in the execution environment can include values indicating a number of various types of physical devices for which device emulators are to be launched. For example, a user might desire for X number of device emulators 516A, 516B, . . . , 516N as part of a voice assistant-enabled device group 518A representing one type of physical device. In this example, the load testing service 500 can launch emulators with device definitions corresponding to the requested type of device, as described elsewhere herein, prior to performing configured load testing against those devices. A same user might further, for example, desire Y number of device emulators 520A, . . . , 520N as part of a voice assistant-enabled device group 518B, representing a different type of part device, and Z number of device emulators 522A, 522B, . . . , 522N representing yet another type of physical device as part of a voice assistant-enabled device group 518N. In this manner, users to perform load testing against heterogenous collections of emulated physical devices to further mimic the behavior of services against varied types of devices in the real world.

In some examples, the text utterances 512 to be used to invoke interactions with the emulators can be provided a text utterance test suite including any number of different text utterances (e.g., where particular text utterances can be used to test particular features, APIs, external services, etc.). The text utterances can be provided as text input to a web-based portal, in a text file, using an interaction specification language, or using any other format.

In some examples, the load information 514 indicating a number of interactions to be used against emulators in the execution environment can be used to instruct the load testing service 500 how often to send interaction input to the emulated devices based upon the specified text utterances. In some examples, users can further provide input specifying a varying rate of interactions to be executed over time, e.g., such that only 10% of the maximum load is executed for a first period of time, 50% executed for a second period time, 100% of the load executed for a third period of time, down to 75% for a fourth period of time, and so forth, to simulate varying network traffic levels in real life gameday events.

In some examples, a user can further optionally configure one or more load testing schedule(s) 504 each associated with one or more load testing plan(s) 502. A load testing schedule 504, for example, broadly enables users to configure a schedule for executing one or more associated load testing plans, e.g., including start times, stop times, to indicate whether the plans are to be executed on a recurring basis, etc.

FIG. 6 illustrates an example schedule configuration interface according to some examples. As shown, the schedule configuration interface 600 provides several interface elements enabling users to configure a schedule for executing one or more load testing plans. As indicated above, the schedule configuration interface 600 can be provided as part of a web-based portal provided by the voice assistant-enabled device load testing service 500. As shown, the schedule configuration interface 600 includes interface elements enabling users to specify an owner of the schedule, watchers of the schedule, a region in which to execute the schedule, load configuration 602, a checkbox to indicate whether to execute the schedule on a recurring basis, among other configurations.

FIG. 7 illustrates an example schedule listing interface according to some examples. As shown, the schedule listing interface 700 includes a list of configured schedules and further includes interface elements corresponding to schedule actions 702. The schedule actions, for example, can be used to manually start a selected schedule, modify a schedule, delete a schedule, pause a currently executing schedule, view a report associated with a schedule, and the like.

Figure 8:
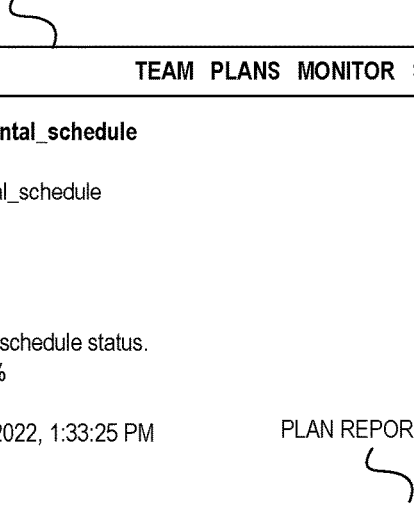
FIG. 8 illustrates an example schedule report interface according to some examples.

FIG. 8 illustrates an example schedule report interface according to some examples. The schedule report interface 800, for example, includes information about a particular selected schedule (e.g., the "_saso_experimental_schedule"), including a status indicating whether the schedule is in progress, paused, idle, etc. The schedule report interface 800 can further display for an in progress schedule a current rate of transactions being executed against deployed emulators. The schedule report interface 800 further includes a plan reports 802 table listing associated load testing plans, where information about each associated load testing plan can include a name of the plan, a max target load, a current rate of transactions, a number of tests passed, a number of tests failed, a number of tests skipped, etc.

In some examples, a user can further configure one or more monitors used to monitor the operation or performance one or more components associated with a voice assistant-technology platform. In some examples, the monitors can be implemented by one or more application and infrastructure monitoring services 524. In general, the application and infrastructure monitoring services 524 can collect monitoring and operational data in the form of logs, metrics, and events to help users detect anomalous behavior in computing environments, set alarms, take automated actions, and the like. This information can be used, for example, to configure monitors to observe the operation of components of a voice assistant-enabled technology platform (e.g., including device emulators, voice assistant services 112, computing system resource services 104, or other dependent services) for specified thresholds (e.g., CPU thresholds, memory thresholds, networking thresholds, interaction thresholds, etc.). In some examples, a monitor can be configured to report to the load testing service 500 performance and operational information, indications of alarms (e.g., when a monitored component exceeds one or more defined thresholds), and the like.

Returning to FIG. 5, at circle "2," at some point in time a scheduler 526 determines that a plan is to be executed based on scheduling information associated with the plan. For example, the scheduler 526 can store configured load testing plans and schedules in a schedules database and periodically or continuously monitor the database for schedules with a start time matching the current time.

Once it is determined that a plan is to be executed at a specified time, the voice assistant-enabled device load testing service 500, at circle "3," launches some number of voice assistant-enabled device emulators in a computing environment 508. As indicated above, the launched device emulators can be based on a distribution of device types specified as part of a load testing plans. In some examples, the device emulators can be launched in the computing environment prior to the scheduler 526 determining that a schedule is to begin execution.

In some examples, at circle "4," the voice assistant-enabled device load testing service 500 optionally uses a text-to-voice service 528 to convert text-based utterances 512 provided as part of a load testing plan to audio-based utterances. The text-to-voice service 528, for example, can be a service that automatically turns text into lifelike speech. The voice assistant-enabled device load testing service 500 can send text-based utterances 512 to the text-to-voice service 528 for conversion to audio data, and then stream the audio data to one or more launched emulators to simulate voice input to the device emulators. In other examples, the load testing service 500 can instead provide pre-recorded speech utterances or provide text-based utterances to the device emulators depending on configuration by a user.

At circle "5," the voice assistant-enabled device load testing service 500 invokes interactions against the launched voice assistant-enabled device emulators based on the one or more utterances 512 defined in the load testing plan(s) and the rate of interactions to be invoked. The load testing service 500, for example, can execute the load testing plan(s) 502 by causing utterances or other input to be provided to the launched device emulators at a rate of transactions specified in the load testing plans 502 or schedules 504. The utterances can be sent to the device emulators by the load testing service 500, using an interaction engine 400, or any other component that can communicate the utterances to the emulators at a defined rate. In some examples, a load updater 530 can monitor the rate at which interactions are generated and cause load to be increased or decreased over time according to a defined plan or schedule.

At circle "6," an example device emulator 516A receives one of the interactions and processes the interaction. As described above in relation to FIG. 1, for example, the device emulator 516A processing the interaction can include interfacing with voice assistant services 112 and possibly other components of the provider network 100 to perform ASR, NLU, and other processes to generate a response. In general, interactions can be distributed across the device emulators randomly, according to a configured weighted distribution of interactions, etc.

At circle "7," one or more application and infrastructure monitoring services 524 obtain performance or operational information about the device emulators, voice assistant services 112, or any other components. As indicated above, monitors associated with one or more application and infrastructure monitoring services 524 can monitor various components of a voice assistant-enabled technology platform and report the information back to the load testing service 500. The performance information can include a number of transactions processed over time, computing resource utilization levels (e.g., CPU, memory, networking), or any other measurable performance or operational information.

At circle "8," a reporter 532 component of the voice assistant-enabled device load testing service 500 obtains data from the application and infrastructure monitoring services 500 or other types of monitors and generates one or more reports 534 reflecting performance of the voice assistant technology platform responsive to the load provided by the voice assistant-enabled device load testing service 500. In this manner, users can easily monitor the performance of ongoing load tests, view indications of alarms triggered, and the like. In some examples, a load testing service 500 can monitor for incidents of high severity alerts (e.g., alerts indicating that one or more services involved in a voice assistant-technology platform are experiencing a significant issue affecting the operation of a service) and automatically perform one or more actions. In other examples, users can also configure other types of custom responses to instances of configured alarms being triggered such as, e.g., pausing or stopping the load test, sending alerts to associated users, and the like.

As indicated above, a user can configure a load testing plan or schedule to adjust an amount of load (e.g., a number of interactions per minute) applied against a collection of voice assistant-enabled device emulators over time. In some examples, a user can also modify a time at which load changes are modified during the execution of a load testing schedule. FIG. 9 illustrates an example schedule listing interface enabling users to dynamically adjust times at which load changes occur according to some examples. The schedule listing interface 900, for example, again lists a set of schedules configured in the load testing service 500. The example interface 900 further illustrates example load change modification elements 902 enabling a user to adjust an amount of time before a next load change takes place (e.g., if a load change was initially scheduled to occur in 10 minutes, the user can subtract or add some number of minutes to dynamically change when the load change occurs).

Figure 10:
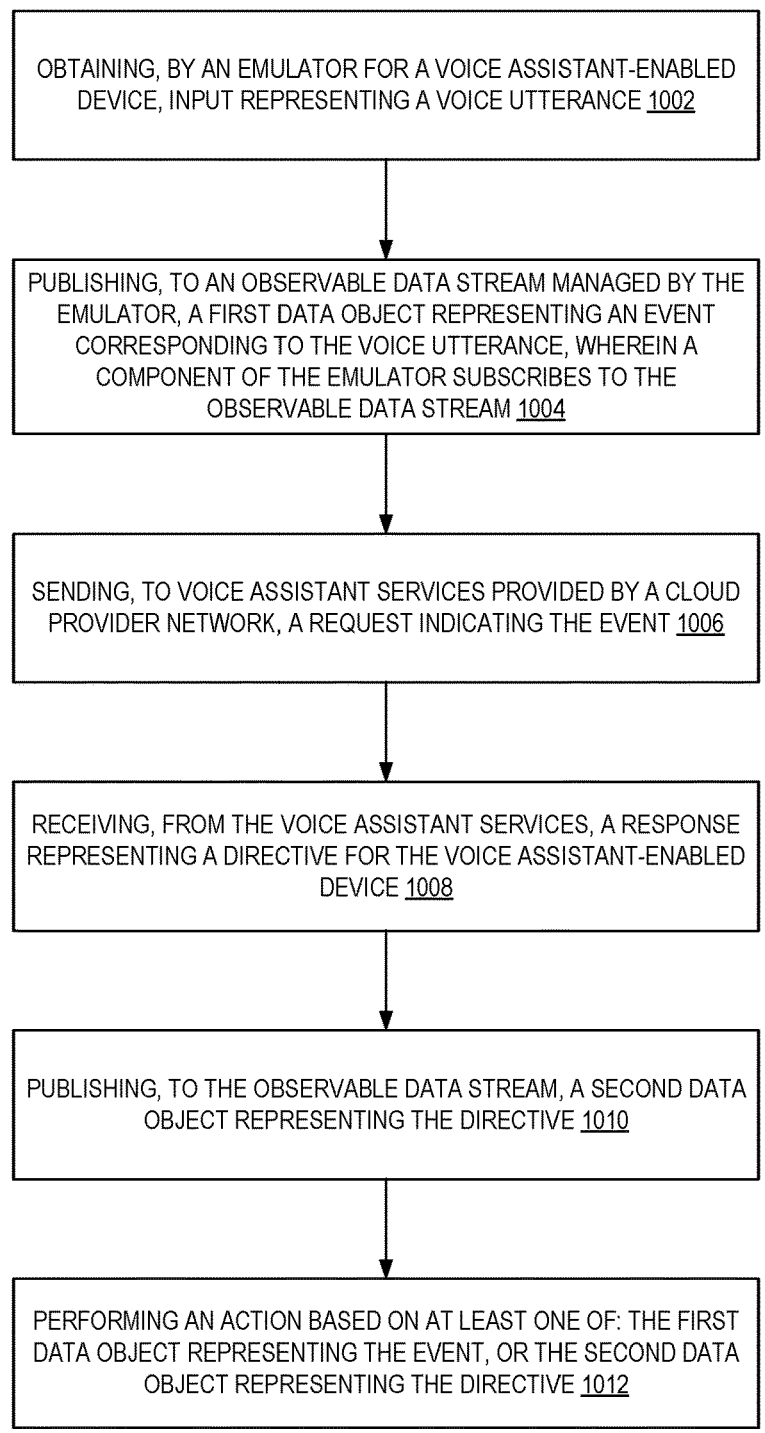
FIG. 10 is a flow diagram illustrating operations of a method for using emulation software to emulate voice assistant-technology enabled devices according to some examples.

FIG. 10 is a flow diagram illustrating operations 1000 of a method for using emulation software to emulate voice assistant-technology enabled devices according to some examples. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by a voice assistant-enabled device emulator 116 of the other figures.

The operations 1000 include, at block 1002, obtaining, by an emulator for a voice assistant-enabled device, input representing a voice utterance.

The operations 1000 further include, at block 1004, publishing, to an observable data stream managed by the emulator, a first data object representing an event corresponding to the voice utterance, wherein a component of the emulator subscribes to the observable data stream.

The operations 1000 further include, at block 1006, sending, to voice assistant services provided by a cloud provider network, a request indicating the event.

The operations 1000 further include, at block 1008, receiving, from the voice assistant services, a response representing a directive for the voice assistant-enabled device.

The operations 1000 further include, at block 1010, publishing, to the observable data stream, a second data object representing the directive.

The operations 1000 further include, at block 1012, performing an action based on at least one of the first data object representing the event, or the second data object representing the directive.

In some examples, the emulator stores state data associating the event with the directive, and wherein the emulator publishes a third data object to the observable data stream reflecting the state data.

In some examples, the operations further include receiving a request to launch the emulator based on a specified device definition, wherein the device definition includes identifiers of capabilities associated with a type of physical voice assistant-enabled device; and launching the emulator based on the specified device definition.

In some examples, the operations further include launching the emulator based in part on application code implementing a custom capability for the emulator; obtaining, from the response, response payload data associated with the directive; and causing the application code to perform an action on the response payload data.

In some examples, the observable data stream includes a plurality of data objects including the first data object, the second data object, and a third data object representing a state change reflecting an action performed by the emulator, and wherein a process subscribing to the observable data stream causes perform an action with the data object from the observable data stream.

In some examples, the input representing the voice utterance includes at least one of audio data, or text data.

In some examples, the response is a first response and wherein the directive is a first directive, and the operations further include: launching the emulator based in part on application code implementing a custom capability for the emulator, wherein the custom capability is associated with a type of directive; receiving, from the voice assistant services, a second response representing a second directive associated with the type of directive; and causing the application code implementing the custom capability to perform an action based on the second directive.

In some examples, the emulator for the voice assistant-enabled device performs a multi-turn chat dialog with the voice assistant services based on a dialogue identifier and context information provided by the emulator to the voice assistant services.

In some examples, the emulator includes an implementation of a connection interface used to simulate varying network connection qualities, and wherein the implementation of the connection interface includes actions to simulate at least one of: network latency, packet loss, or network outages.

In some examples, the operations further include receiving, by an interaction engine, interaction specification data conforming to a domain-specific language for defining voice assistant-enabled device interactions; and performing, by the interaction engine, at least one interaction with the emulator for the voice assistant-enabled device based on the interaction specification data.

In some examples, the operations further include receiving, by an interaction engine, interaction specification data conforming to a domain-specific language for defining voice assistant-enabled device interactions; and performing, by the interaction engine, an interaction based on the interaction specification data, wherein the interaction is performed with the emulator for the voice assistant-enabled device and with a physical voice assistant-enable device.

In some examples, the request is a first request, and the operations further include: launching the emulator based in part on user-provided application code extending an interface associated with providing context information to the voice assistant services, wherein the context information indicates a current state of the emulator; and sending, to the voice assistant services, a second request generated in part by the user-provided application code extending the interface associated with providing context information to the voice assistant services, wherein the second request includes custom context information generated by the user-provided application code.

Figure 11:
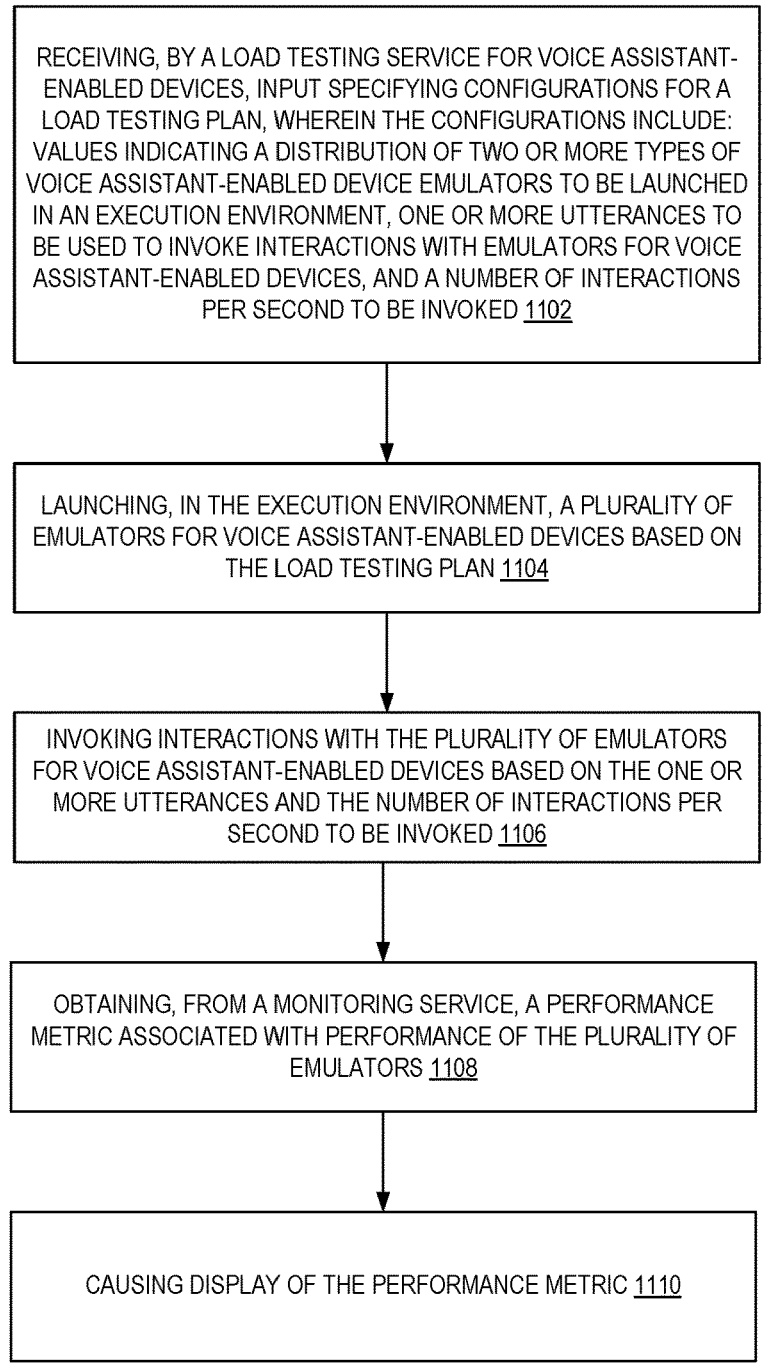
FIG. 11 is a flow diagram illustrating operations of a method for using a platform used to perform and monitor large scale load tests against configurable collections of voice assistant-enabled device emulators according to some examples.

FIG. 11 is a flow diagram illustrating operations 1100 of a method for using a platform used to perform and monitor large scale load tests against configurable collections of voice assistant-enabled device emulators according to some examples. Some or all of the operations 1100 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1100 are performed by the load testing service 500 of the other figures.

The operations 1100 include, at block 1102, receiving, by a load testing service for voice assistant-enabled devices, input specifying configurations for a load testing plan, wherein the configurations include: values indicating a distribution of two or more types of voice assistant-enabled device emulators to be launched in an execution environment, one or more utterances to be used to invoke interactions with emulators for voice assistant-enabled devices, and a rate of interactions to be invoked.

The operations 1100 further include, at block 1104, launching, in the execution environment, a plurality of emulators for voice assistant-enabled devices based on the load testing plan.

The operations 1100 further include, at block 1106, invoking interactions with the plurality of emulators for voice assistant-enabled devices based on the one or more utterances and the rate of interactions to be invoked.

The operations 1100 further include, at block 1108, obtaining, from a monitoring service, a performance metric associated with performance of the plurality of emulators.

The operations 1100 further include, at block 1110, causing display of the performance metric.

In some examples, the operations further include receiving, via a graphical user interface (GUI), input configuring a load testing schedule, wherein the load testing schedule includes two or more load testing plans including the load testing plan, and wherein the load testing schedule indicates a scheduled time and duration at which to execute each of the two or more load testing plans; and executing the two or more load testing plans according to the load testing schedule.

In some examples, the operations further include sending an utterance from the one or more utterances to a text-to-speech service of a cloud provider network to obtain audio data corresponding to the utterance; and providing the audio data corresponding to the utterance to an emulator.

In some examples, the load testing plan specifies varying amounts of load over a defined period of time, and wherein invoking the interactions with the plurality of emulators.

In some examples, the operations further include obtaining, from a service of a cloud provider network, an indication of a high severity event affecting operation of the service; and terminating the load testing plan.

In some examples, the operations further include causing display of a load test performance report including the performance metrics, and wherein the load test performance report includes information associated with a plurality of load test plans including the load test plan, and wherein the information associated with the load test plan includes an identifier of a service tested by the load test plan.

In some examples, the input specifying the configurations for the load testing plan further includes an identifier of an execution environment including one or more compute instances to be used to launch emulators for voice assistant-enabled devices, wherein the execution environment includes a plurality of accounts of the cloud provider network.

In some examples, the input specifying the configurations for the load testing plan further includes an identifier of a voice assistant-related service to be monitored, and wherein the performance metric is associated with the voice assistant-related service.

In some examples, the two or more types of voice assistant-enabled devices to be launched in the execution environment correspond to two or more types of physical voice assistant-enabled devices.

In some examples, the load testing plan includes a schedule of load changes to occur over a period of time, and wherein the operations further include: receiving input requesting to modify a time at which a next load change is to occur to obtain a modified load change time; and modifying the load of the load testing plan at the modified load change time.

In some examples, the operations further include obtaining, from the monitoring service, an indication that an alarm associated with performance of the plurality of emulators was triggered; and performing an action responsive to the alarm.

Figure 12:
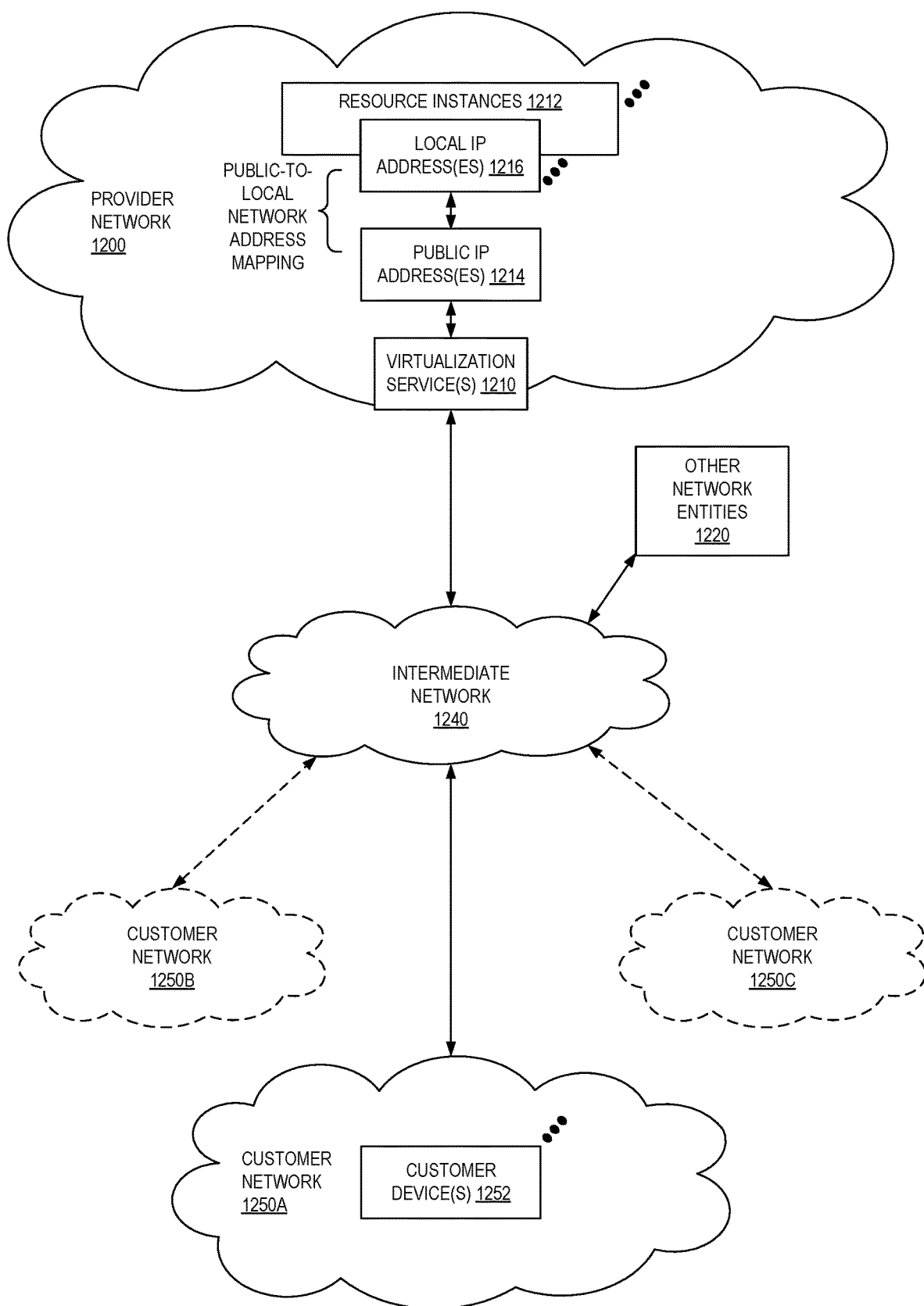
FIG. 12 illustrates an example provider network environment according to some examples.

FIG. 12 illustrates an example provider network (or "service provider system") environment according to some examples. A provider network 1200 can provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 can be associated with the resource instances 1212; the local IP addresses are the internal network addresses of the resource instances 1212 on the provider network 1200. In some examples, the provider network 1200 can also provide public IP addresses 1214 and/or public IP address ranges (e.g., Internet Protocol version 4 (IPv4) or Internet Protocol version 6 (IPv6) addresses) that customers can obtain from the provider 1200.

Conventionally, the provider network 1200, via the virtualization services 1210, can allow a customer of the service provider (e.g., a customer that operates one or more customer networks 1250A-1250C (or "client networks") including one or more customer device(s) 1252) to dynamically associate at least some public IP addresses 1214 assigned or allocated to the customer with particular resource instances 1212 assigned to the customer. The provider network 1200 can also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of the customer network(s) 1250A-1250C can, for example, implement customer-specific applications and present the customer's applications on an intermediate network 1240, such as the Internet. Other network entities 1220 on the intermediate network 1240 can then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 can be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1200; a customer can then assign their allocated public IP addresses to particular resource instances allocated to the customer. These public IP addresses can be referred to as customer public IP addresses, or simply customer IP addresses. Instead of being assigned by the provider network 1200 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
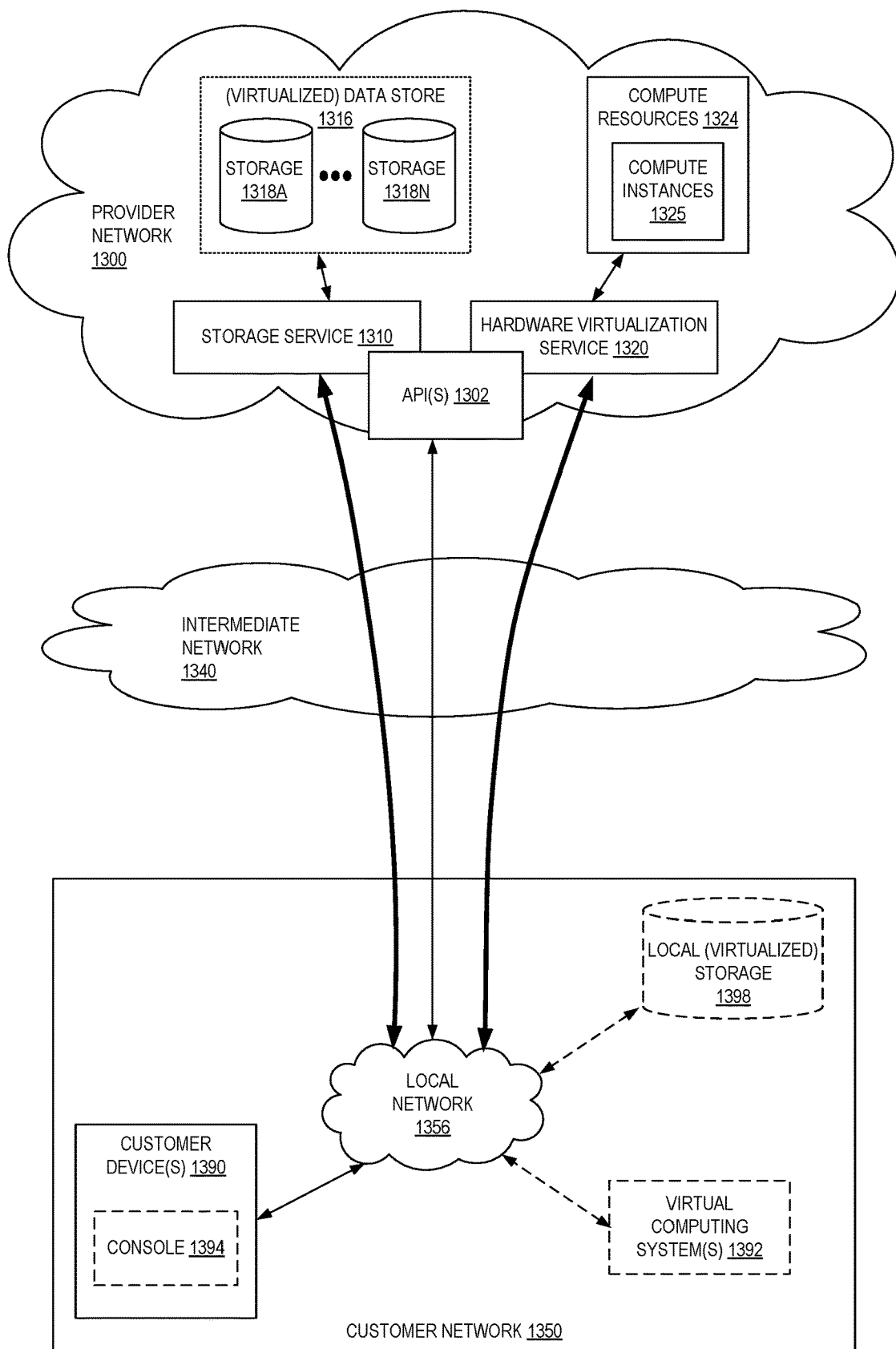
FIG. 13 is a block diagram of an example provider network that provides a storage service and a hardware virtualization service to customers according to some examples.

FIG. 13 is a block diagram of an example provider network environment that provides a storage service and a hardware virtualization service to customers, according to some examples. A hardware virtualization service 1320 provides multiple compute resources 1324 (e.g., compute instances 1325, such as VMs) to customers. The compute resources 1324 can, for example, be provided as a service to customers of a provider network 1300 (e.g., to a customer that implements a customer network 1350). Each computation resource 1324 can be provided with one or more local IP addresses. The provider network 1300 can be configured to route packets from the local IP addresses of the compute resources 1324 to public Internet destinations, and from public Internet sources to the local IP addresses of the compute resources 1324.

The provider network 1300 can provide the customer network 1350, for example coupled to an intermediate network 1340 via a local network 1356, the ability to implement virtual computing systems 1392 via the hardware virtualization service 1320 coupled to the intermediate network 1340 and to the provider network 1300. In some examples, the hardware virtualization service 1320 can provide one or more APIs 1302, for example a web services interface, via which the customer network 1350 can access functionality provided by the hardware virtualization service 1320, for example via a console 1394 (e.g., a web-based application, standalone application, mobile application, etc.) of a customer device 1390. In some examples, at the provider network 1300, each virtual computing system 1392 at the customer network 1350 can correspond to a computation resource 1324 that is leased, rented, or otherwise provided to the customer network 1350.

From an instance of the virtual computing system(s) 1392 and/or another customer device 1390 (e.g., via console 1394), the customer can access the functionality of a storage service 1310, for example via the one or more APIs 1302, to access data from and store data to storage resources 1318A-1318N of a virtual data store 1316 (e.g., a folder or "bucket," a virtualized volume, a database, etc.) provided by the provider network 1300. In some examples, a virtualized data store gateway (not shown) can be provided at the customer network 1350 that can locally cache at least some data, for example frequently accessed or critical data, and that can communicate with the storage service 1310 via one or more communications channels to upload new or modified data from a local cache so that the primary store of data (the virtualized data store 1316) is maintained. In some examples, a user, via the virtual computing system 1392 and/or another customer device 1390, can mount and access virtual data store 1316 volumes via the storage service 1310 acting as a storage virtualization service, and these volumes can appear to the user as local (virtualized) storage 1398.

While not shown in FIG. 13, the virtualization service(s) can also be accessed from resource instances within the provider network 1300 via the API(s) 1302. For example, a customer, appliance service provider, or other entity can access a virtualization service from within a respective virtual network on the provider network 1300 via the API(s) 1302 to request allocation of one or more resource instances within the virtual network or within another virtual network.

Figure 14:
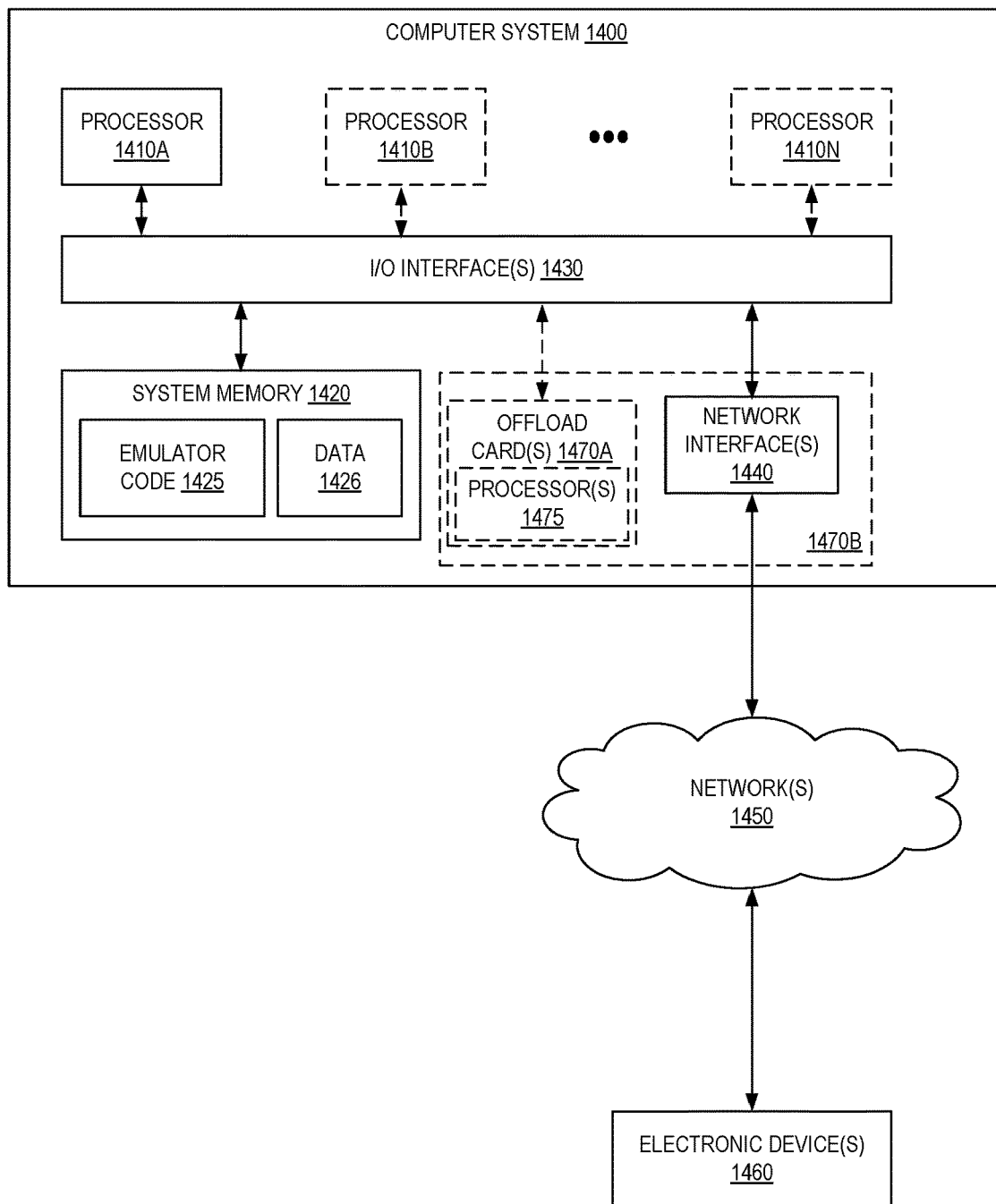
FIG. 14 is a block diagram illustrating an example computer system that can be used in some examples.

In some examples, a system that implements a portion or all of the techniques described herein can include a general-purpose computer system, such as the computer system 1400 illustrated in FIG. 14, that includes, or is configured to access, one or more computer-accessible media. In the illustrated example, the computer system 1400 includes one or more processors 1410 coupled to a system memory 1420 via an input/output (I/O) interface 1430. The computer system 1400 further includes a network interface 1440 coupled to the I/O interface 1430. While FIG. 14 shows the computer system 1400 as a single computing device, in various examples the computer system 1400 can include one computing device or any number of computing devices configured to work together as a single computer system 1400.

In various examples, the computer system 1400 can be a uniprocessor system including one processor 1410, or a multiprocessor system including several processors 1410 (e.g., two, four, eight, or another suitable number). The processor(s) 1410 can be any suitable processor(s) capable of executing instructions. For example, in various examples, the processor(s) 1410 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1410 can commonly, but not necessarily, implement the same ISA.

The system memory 1420 can store instructions and data accessible by the processor(s) 1410. In various examples, the system memory 1420 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1420 as emulator code 1425 (e.g., executable to implement, in whole or in part, a voice assistant-enabled emulator 116) and data 1426.

In some examples, the I/O interface 1430 can be configured to coordinate I/O traffic between the processor 1410, the system memory 1420, and any peripheral devices in the device, including the network interface 1440 and/or other peripheral interfaces (not shown). In some examples, the I/O interface 1430 can perform any necessary protocol, timing, or other data transformations to convert data signals from one component (e.g., the system memory 1420) into a format suitable for use by another component (e.g., the processor 1410). In some examples, the I/O interface 1430 can include support for devices attached through various types of peripheral buses, such as a variant of the Peripheral Component Interconnect (PCI) bus standard or the Universal Serial Bus (USB) standard, for example. In some examples, the function of the I/O interface 1430 can be split into two or more separate components, such as a north bridge and a south bridge, for example. Also, in some examples, some or all of the functionality of the I/O interface 1430, such as an interface to the system memory 1420, can be incorporated directly into the processor 1410.

The network interface 1440 can be configured to allow data to be exchanged between the computer system 1400 and other devices 1460 attached to a network or networks 1450, such as other computer systems or devices as illustrated in FIG. 1, for example. In various examples, the network interface 1440 can support communication via any suitable wired or wireless general data networks, such as types of Ethernet network, for example. Additionally, the network interface 1440 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1400 includes one or more offload cards 1470A or 1470B (including one or more processors 1475, and possibly including the one or more network interfaces 1440) that are connected using the I/O interface 1430 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1400 can act as a host electronic device (e.g., operating as part of a hardware virtualization service) that hosts compute resources such as compute instances, and the one or more offload cards 1470A or 1470B execute a virtualization manager that can manage compute instances that execute on the host electronic device. As an example, in some examples the offload card(s) 1470A or 1470B can perform compute instance management operations, such as pausing and/or un-pausing compute instances, launching and/or terminating compute instances, performing memory transfer/copying operations, etc. These management operations can, in some examples, be performed by the offload card(s) 1470A or 1470B in coordination with a hypervisor (e.g., upon a request from a hypervisor) that is executed by the other processors 1410A-1410N of the computer system 1400. However, in some examples the virtualization manager implemented by the offload card(s) 1470A or 1470B can accommodate requests from other entities (e.g., from compute instances themselves), and cannot coordinate with (or service) any separate hypervisor.

In some examples, the system memory 1420 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1400 via the I/O interface 1430. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1400 as the system memory 1420 or another type of memory. Further, a computer-accessible medium can include transmission media or signals such as electrical, electromagnetic, or digital signals, conveyed via a communication medium such as a network and/or a wireless link, such as can be implemented via the network interface 1440.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1318A-1318N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, via a graphical user interface (GUI) provided by a load testing service for voice assistant-enabled devices, input specifying configurations for a load testing plan, wherein the configurations include:
      an identifier of an execution environment including one or more compute instances to be used to launch emulators for voice assistant-enabled devices,
      values indicating a distribution of two or more types of voice assistant-enabled devices to be launched in the execution environment,
      one or more text utterances to be used to invoke interactions with the emulators for voice assistant-enabled devices, and
      a rate of interactions to be invoked against the emulators for voice assistant-enabled devices in the execution environment;
   launching, in the execution environment, the emulators based on the load testing plan, wherein the emulators include at least a first set of emulators for a first type of voice assistant-enabled device and a second set of emulators for a second type of voice assistant-enabled device that is different from the first type of voice assistant-enabled device, and wherein a number of the first set of emulators and the second set of emulators is based on the values indicating the distribution of two or more types of voice assistant-enabled devices against which to invoke interactions;
   invoking interactions with the emulators based on audio data corresponding to the one or more text utterances and the rate of interactions to be invoked, wherein invoking the interactions involves the emulators interfacing with at least one service;
   obtaining, from a monitoring service, a performance metric associated with the emulators or the at least one service; and
   causing display of the performance metric.

2. The computer-implemented method of claim 1, further comprising:
receiving, via the GUI, input configuring a load testing schedule, wherein the load testing schedule includes one or more load testing plans including the load testing plan, and wherein the load testing schedule indicates a scheduled time and duration at which to execute each of the one or more load testing plans; and
executing the one or more load testing plans according to the load testing schedule.

3. The computer-implemented method of claim 1, further comprising:
sending a text utterance from the one or more text utterances to a text-to-speech service of a cloud provider network to obtain audio data corresponding to the text utterance; and
providing the audio data corresponding to the text utterance to at least one of the emulators.

4. A computer-implemented method comprising:
receiving, by a load testing service for voice assistant-enabled devices, input specifying configurations for a load testing plan, wherein the configurations include:
values indicating a distribution of two or more types of emulators for voice assistant-enabled devices to be launched in an execution environment for load testing,
one or more utterances to be used to invoke interactions with the emulators for voice assistant-enabled devices during load testing, and
a rate of the interactions to be invoked with the emulators for voice assistant-enabled devices during load testing;
launching, in the execution environment, the emulators based on the load testing plan, wherein the emulators include at least a first set of emulators for a first type of voice assistant-enabled device and a second set of emulators for a second type of voice assistant-enabled device that is different from the first type of voice assistant-enabled device, and wherein a number of the first set of emulators and the second set of emulators is based on the values indicating the distribution of two or more types of emulators for voice assistant-enabled devices to be launched in the execution environment for load testing;
executing load tests by invoking interactions with the emulators based on the one or more utterances and the rate of interactions to be invoked;
obtaining, from a monitoring service, a performance metric associated with performance of the emulators during the load tests; and
causing display of the performance metric.

5. The computer-implemented method of claim 4, further comprising:
receiving, via a graphical user interface (GUI), input configuring a load testing schedule, wherein the load testing schedule includes two or more load testing plans including the load testing plan, and wherein the load testing schedule indicates a scheduled time and duration at which to execute each of the two or more load testing plans; and
executing the two or more load testing plans according to the load testing schedule.

6. The computer-implemented method of claim 4, further comprising:
sending an utterance from the one or more utterances to a text-to-speech service of a cloud provider network to obtain audio data corresponding to the utterance; and
providing the audio data corresponding to the utterance to at least one of the emulators.

7. The computer-implemented method of claim 4, wherein the load testing plan specifies varying amounts of load over a defined period of time, and wherein invoking the interactions involves the emulators interfacing with at least one service.

8. The computer-implemented method of claim 4, further comprising:
obtaining, from a service of a cloud provider network, an indication of a high severity event affecting operation of the service; and
terminating the load testing plan.

9. The computer-implemented method of claim 4, further comprising causing display of a load test performance report including the performance metrics, and wherein the load test performance report includes information associated with a plurality of load test plans including the load test plan, and wherein the information associated with the load test plan includes an identifier of a service tested by the load test plan.

10. The computer-implemented method of claim 4, wherein the input specifying the configurations for the load testing plan further includes an identifier of an execution environment including one or more compute instances to be used to launch the emulators, wherein the execution environment includes a plurality of accounts of a cloud provider network.

11. The computer-implemented method of claim 4, wherein the input specifying the configurations for the load testing plan further includes an identifier of a voice assistant-related service to be monitored, and wherein the performance metric is associated with the voice assistant-related service.

12. The computer-implemented method of claim 4, wherein the two or more types of voice assistant-enabled devices to be launched in the execution environment correspond to two or more types of physical voice assistant-enabled devices.

13. The computer-implemented method of claim 4, wherein the load testing plan includes a schedule of load changes to occur over a period of time, and wherein the method further comprises:
receiving input requesting to modify a time at which a next load change is to occur to obtain a modified load change time; and
modifying the load of the load testing plan at the modified load change time.

14. The computer-implemented method of claim 4, further comprising:
obtaining, from the monitoring service, an indication that an alarm associated with performance of the emulators was triggered; and
performing an action responsive to the alarm.

15. A system comprising:
a first one or more electronic devices to implement a voice assistant-enabled device load testing service in a multi-tenant provider network, wherein the voice assistant-enabled device load testing service includes instructions that upon execution cause the voice assistant-enabled device load testing service to:
receive, by a load testing service for voice assistant-enabled devices, input specifying configurations for a load testing plan, wherein the configurations include:

values indicating a distribution of two or more types of emulators for voice assistant-enabled devices to be launched in an execution environment for load testing,
one or more utterances to be used to invoke interactions with the emulators for voice assistant-enabled devices during load testing, and
a rate of the interactions to be invoked with the emulators for voice assistant-enabled devices during load testing;
launch, in the execution environment, the emulators for voice assistant-enabled devices based on the load testing plan, wherein the emulators include at least a first set of emulators for a first type of voice assistant-enabled device and a second set of emulators for a second type of voice assistant-enabled device that is different from the first type of voice assistant-enabled device, and wherein a number of the first set of emulators and the second set of emulators is based on the values indicating the distribution of two or more types of emulators for voice assistant-enabled devices to be launched in the execution environment for load testing;
execute load tests by invoking interactions with the emulators based on the one or more utterances and the rate of interactions to be invoked;
obtain, from a monitoring service, a performance metric associated with performance of the emulators during the load tests; and
cause display of the performance metric; and
a second one or more electronic devices to implement the emulators for voice assistant-enabled devices in the multi-tenant provider network, wherein the emulators for voice assistant-enabled devices include instructions that upon execution cause the emulators for voice assistant-enabled devices to:
receive an input corresponding to interaction from the voice assistant-enabled device load testing service;
perform an action based on the input.

16. The system of claim 15, wherein the voice assistant-enabled device load testing service further includes instructions that upon execution further cause the voice assistant-enabled device load testing service to:
receive, via a graphical user interface (GUI), input configuring a load testing schedule, wherein the load testing schedule includes two or more load testing plans including the load testing plan, and wherein the load testing schedule indicates a scheduled time and duration at which to execute each of the two or more load testing plans; and
execute the two or more load testing plans according to the load testing schedule.

17. The system of claim 15, wherein the voice assistant-enabled device load testing service further includes instructions that upon execution further cause the voice assistant-enabled device load testing service to:
send a text utterance from the one or more text utterances to a text-to-speech service of a cloud provider network to obtain audio data corresponding to the text utterance; and
provide the audio data corresponding to the text utterance to at least one of the emulators.

18. The system of claim 15, wherein the load testing plan specifies varying amounts of load over a defined period of time, and wherein invoking the interactions involves the emulators interfacing with at least one service.

19. The system of claim 15, wherein the voice assistant-enabled device load testing service further includes instructions that upon execution further cause the voice assistant-enabled device load testing service to:
obtain, from a service of a cloud provider network, an indication of a high severity event affecting operation of the service; and
terminate the load testing plan.

20. The system of claim 15, wherein the voice assistant-enabled device load testing service further includes instructions that upon execution further cause the voice assistant-enabled device load testing service to cause display of a load test performance report including the performance metric.

* * * * *